(12) United States Patent
Srinivasamurthy et al.

(10) Patent No.: US 12,047,566 B2
(45) Date of Patent: Jul. 23, 2024

(54) METHOD AND SYSTEM OF BIT RATE CONTROL

(71) Applicant: Texas Instruments Incorporated, Dallas, TX (US)

(72) Inventors: Naveen Srinivasamurthy, Bangalore (IN); Mahant Siddaramanna, Bangalore (IN); Soyeb Nagori, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 194 days.

(21) Appl. No.: 17/524,618

(22) Filed: Nov. 11, 2021

(65) Prior Publication Data

US 2022/0078414 A1    Mar. 10, 2022

Related U.S. Application Data

(63) Continuation of application No. 16/901,078, filed on Jun. 15, 2020, now Pat. No. 11,202,067, which is a continuation of application No. 13/303,748, filed on Nov. 23, 2011, now Pat. No. 10,728,545.

(51) Int. Cl.
*H04N 19/115* (2014.01)
*H04N 19/149* (2014.01)
*H04N 19/172* (2014.01)

(52) U.S. Cl.
CPC ......... *H04N 19/115* (2014.11); *H04N 19/149* (2014.11); *H04N 19/172* (2014.11)

(58) Field of Classification Search
CPC ... H04N 19/115; H04N 19/149; H04N 19/172
See application file for complete search history.

(56) References Cited

U.S. PATENT DOCUMENTS

| | | | |
|---|---|---|---|
| 6,157,674 A | 12/2000 | Oda et al. | |
| 6,215,820 B1 | 4/2001 | Bagni et al. | |
| 6,625,322 B1 | 9/2003 | Kondo et al. | |
| 2004/0037357 A1* | 2/2004 | Bagni | G06T 9/007 |
| | | | 375/240.03 |
| 2005/0046702 A1 | 3/2005 | Katayama et al. | |
| 2005/0105815 A1* | 5/2005 | Zhang | H04N 19/198 |
| | | | 375/E7.181 |

(Continued)

*Primary Examiner* — Francis Geroleo
(74) *Attorney, Agent, or Firm* — Carl G. Peterson; Frank D. Cimino

(57) ABSTRACT

A method and system for bit rate control during encoding of multimedia data are disclosed. A change in complexity of a multimedia picture relative to complexity associated with one or more multimedia pictures in a multimedia sequence is determined. A complexity associated with a multimedia picture is determined based on number of bits and an average quantization associated with the multimedia picture. A bit rate is adjusted for encoding the multimedia picture based on the change in complexity of the multimedia picture. The bit rate is increased on determining an increase in complexity of the multimedia picture and is decreased on determining a decrease in complexity of the multimedia picture. Utilization of additional bits during the increase in the bit rate and saving of bits during the decrease in the bit rate are compensated during adjusting of bit rates for encoding subsequent multimedia pictures in the multimedia sequence.

20 Claims, 6 Drawing Sheets

(56) References Cited

U.S. PATENT DOCUMENTS

| | | |
|---|---|---|
| 2005/0206785 A1 | 9/2005 | Swan et al. |
| 2007/0147512 A1 | 6/2007 | Eckart |
| 2007/0177665 A1 | 8/2007 | Zhou et al. |
| 2008/0151998 A1 | 6/2008 | He |
| 2009/0086816 A1 | 4/2009 | Leontaris et al. |
| 2009/0097551 A1 | 4/2009 | Zhang et al. |
| 2010/0046846 A1 | 2/2010 | Brown |

* cited by examiner

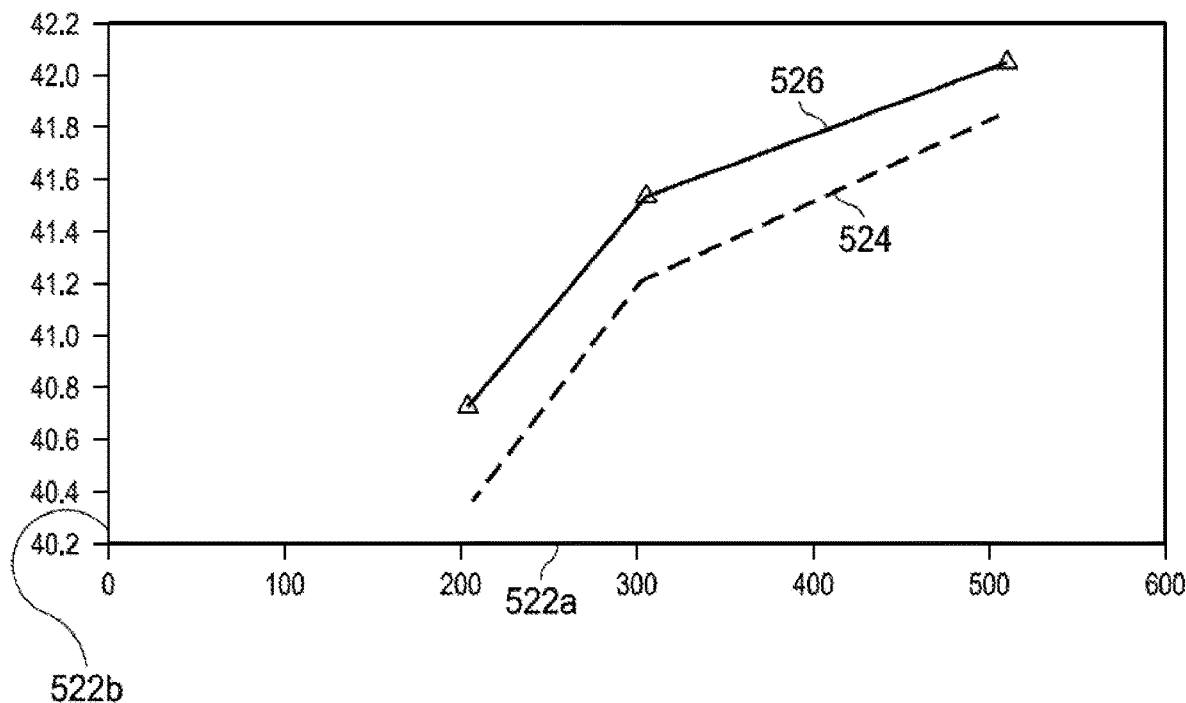
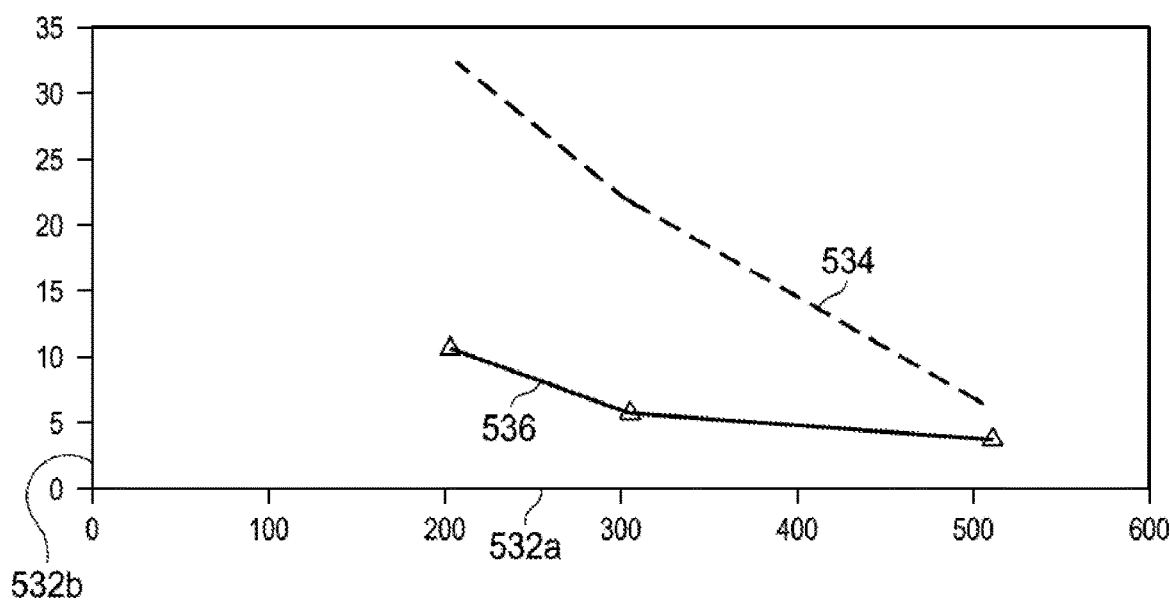

METHOD AND SYSTEM OF BIT RATE CONTROL

CROSS-REFERENCE TO RELATED APPLICATIONS

This application is a continuation of U.S. patent application Ser. No. 16/901,078 filed Jun. 15, 2020, which is a continuation of U.S. patent application Ser. No. 13/303,748, filed Nov. 23, 2011, now U.S. Pat. No. 10,728,545, each of which is incorporated herein by reference in its entirety.

TECHNICAL FIELD

The present disclosure generally relates to the field of data encoding.

BACKGROUND

Pursuant to an exemplary scenario, in multimedia applications, bits generated during the encoding of multimedia data may be minimized while a perceptual quality of the multimedia data is maximized. Multimedia data may be heterogeneous, implying a varying degree of complexity from one multimedia picture to another multimedia picture in a multimedia sequence. An example of a multimedia sequence is a collection of consecutive multimedia pictures with all multimedia pictures in the multimedia sequence belonging to the same or a different scene. The variation of complexity may be observed, for example, in the case of video security applications wherein large durations of minimal activity may occur along with small isolated durations of high activity. This results in a high variation of complexity between the low activity and high activity multimedia pictures. Varying degrees of activity/complexity renders it difficult to achieve a desired bit rate over the duration of the multimedia sequence. Furthermore, maintaining the desired bit rate over both the low complexity and high complexity durations of the multimedia sequence may result in severe multimedia quality degradation.

SUMMARY

Methods and systems for bit rate control during encoding of multimedia data are disclosed. In an embodiment, a method includes determining a change in complexity of a multimedia picture relative to complexity associated with one or more multimedia pictures in a multimedia sequence. In an embodiment, the complexity is determined based on a number of bits and an average quantization associated with the multimedia picture. In an embodiment, determining the change in complexity includes determining a local complexity and a global complexity associated with the multimedia picture and comparing the local complexity and the global complexity based on a predetermined criterion.

The local complexity is determined over a first complexity duration and corresponds to a complexity associated with the multimedia picture (e.g., a current multimedia picture) and at least one of one or more multimedia pictures preceding the multimedia picture (e.g., the current multimedia picture) and/or one or more multimedia pictures succeeding the multimedia picture (e.g., the current multimedia picture). The global complexity is determined over a second complexity duration and corresponds to a complexity associated with the multimedia picture (e.g., the current multimedia picture) and at least one of a plurality of multimedia pictures preceding the multimedia picture (e.g., the current multime-dia picture) and a plurality of multimedia pictures succeeding the multimedia picture (e.g., the current multimedia picture).

In an embodiment, the method further includes adjusting a bit rate for encoding the multimedia data based on the change in complexity of the multimedia picture. In an embodiment, adjusting the bit rate includes performing one of increasing the bit rate on determining an increase in complexity of the multimedia picture and decreasing the bit rate on determining a decrease in complexity of the multimedia picture. The utilization of additional bits during a corresponding increase in the bit rate and saving of bits during a corresponding decrease in the bit rate is compensated by adjusting of bit rates for encoding subsequent multimedia pictures in the multimedia sequence.

In an embodiment, the increase and decrease in the bit rate is proportional to the increase and decrease in the complexity, respectively In an embodiment, additional bits consumed by increasing the bit rate upon determining an increase in complexity of the multimedia picture are identified and subsequently compensated by decreasing the bit rate upon determining a decrease in complexity of a subsequent multimedia picture. In an embodiment, the bit rate is decreased for a duration until all additional bits consumed during the increase of the bit rate are compensated. In an embodiment, additional bits saved by decreasing the bit rate upon determining a decrease in complexity of the multimedia picture are identified. The saved additional bits are subsequently utilized by increasing the bit rate upon determining an increase in complexity of a subsequent multimedia picture.

In an embodiment, a system for the encoding of multimedia data is provided. The system includes a complexity determination engine and a bit rate engine. The complexity determination engine is configured to determine change in complexity of a multimedia picture relative to complexity associated with one or more multimedia pictures in a multimedia sequence. The complexity associated with a multimedia picture is determined based on a number of bits and an average quantization associated the multimedia picture. The bit rate engine is configured to adjust a bit rate for encoding the multimedia data based on the complexity. The bit rate engine is configured to increase the bit rate on determining an increase in complexity of the multimedia picture and/or decrease the bit rate on determining a decrease in complexity of the multimedia picture. The utilization of additional bits during a corresponding increase in the bit rate and saving of bits during a corresponding decrease in the bit rate is compensated by adjusting of bit rates for encoding subsequent multimedia pictures in the multimedia sequence.

Moreover, in an embodiment a computer-readable medium storing a set of instructions that when executed cause a computer to perform a method of bit rate control during encoding multimedia data is provided. In an embodiment, the method includes determining a change in complexity of a multimedia picture relative to complexity associated with one or more multimedia pictures in a multimedia sequence. In an embodiment, the complexity is determined based on a number of bits and an average quantization associated with the multimedia picture. The method also includes adjusting a bit rate for encoding the multimedia picture based on the change in complexity of the multimedia picture. In an embodiment, adjusting the bit rate includes performing one of increasing the bit rate on determining an increase in complexity of the multimedia picture and decreasing the bit rate on determining a decrease in complexity of the multimedia picture. The utilization of additional bits during a corresponding increase in the bit rate and saving of bits during a corresponding decrease in the bit rate is compensated by adjusting of bit rates for encoding subsequent multimedia pictures in the multimedia sequence.

BRIEF DESCRIPTION OF THE FIGURES

FIGS. 5A-5D illustrate improvement of a perceptual multimedia quality on adjusting a bit rate based on a change in complexity of a multimedia sequence, pursuant to an exemplary scenario.

DETAILED DESCRIPTION

Pursuant to an exemplary scenario, a perceptual quality of multimedia data may deteriorate as a result of utilizing a same bit rate of encoding over both the low complexity and high complexity durations of multimedia pictures, especially for multimedia data involving highly varying degrees of complexity. Various embodiments of the present technology, however, provide systems and methods of encoding multimedia data that are capable of overcoming these and other obstacles and providing additional benefits.

The following description and accompanying figures demonstrate that the present technology may be practiced or otherwise implemented in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Figure 1:
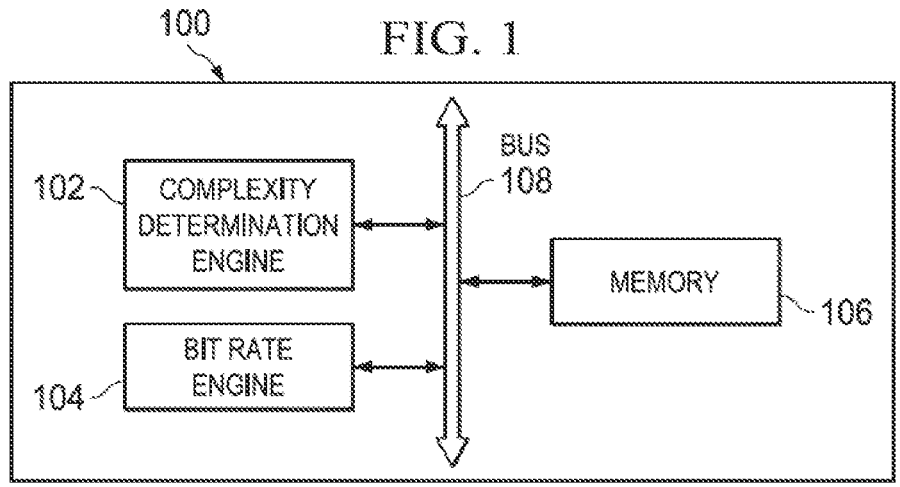
FIG. 1 is a block diagram of a system for encoding multimedia data according to an embodiment.

FIG. 1 is a block diagram of a system 100 for bit rate control during encoding multimedia data associated with a multimedia picture according to an embodiment. Examples of multimedia data include, but are not limited to, video data, and the like. The multimedia picture may be associated with a multimedia sequence. Each multimedia sequence may include one or more multimedia pictures (e.g., video pictures). An example of a multimedia sequence is a collection of consecutive multimedia pictures with all multimedia pictures in the multimedia sequence belonging to the same or a different scene.

In an embodiment, the system 100 is an exemplary form of a computer system within which sets of instructions (for example, instructions for causing system 100 to perform one or more of the methodologies discussed herein) are executed. In various embodiments, the system 100 operates as a standalone device and/or is communicatively associated with, coupled with or connected to (e.g., networked) other machines, including, for example, an encoder configured to encode the multimedia data. In one embodiment, the system 100 is integrated within the encoder. In an embodiment, in a networked deployment, the system 100 operates in the capacity of a server and/or a client machine in a server-client network environment, and/or as a peer machine in a peer-to-peer (or distributed) network environment.

Examples of the system 100 include, but are not limited to, a multimedia encoding device, a personal computer (PC), a tablet PC, a personal digital assistant (PDA), a mobile communication device, a web appliance, a set-top box (STB), an embedded system and/or any machine capable of executing a set of instructions (sequential and/or otherwise) to perform one and/or more of the methodologies discussed herein. In an embodiment, the system 100 is programmed to comply with a video compression standard. Examples of the video compression standards include, but are not limited to, video coding experts group (VCEG), H.120, H.261, moving pictures experts group (MPEG), MPEG-1 Part 2, H.262 or MPEG-2 Part 2, H.263, MPEG-4 Part 2, H.264 or MPEG-4 AVC, VC-2 (Dirac), high efficiency video coding (HEVC), and the like.

In FIG. 1, the system 100 includes a complexity determination engine 102, a bit rate engine 104 and a memory 106. Examples of the memory 106 include, but are not limited to, random access memory (RAM), dual port RAM, synchronous dynamic RAM (SDRAM), double data rate SDRAM (DDR SDRAM), and the like. In an embodiment, the complexity determination engine 102, the bit rate engine 104, and/or the memory 106 are configured to communicate with each other via a bus 108.

In an embodiment, the complexity determination engine 102 is configured to determine a change complexity of a multimedia picture relative to complexity associated with one or more multimedia pictures in a multimedia sequence. In an embodiment, the complexity is determined based on a number of bits (b) and an average quantization (Qs) associated with the multimedia picture. Also, it is noted that the terminology "average quantization" may be construed as referring to, for example, a value or a set of values obtained during a process of approximating the continuous set of values in the multimedia data associated with the multimedia picture with a finite set of values. The term "average quantization" may be used interchangeably with the term "quantization scale". With the increase in complexity of the multimedia picture, one of b and Qs for the multimedia picture increases. The b and the Qs are inversely related, and a product of Qs and b is large for complex multimedia pictures when compared to simple multimedia pictures. In an embodiment, an instantaneous value of complexity of a multimedia picture is defined as the product of b and Qs.

In an embodiment, the complexity associated with a multimedia picture increases due to, for example, an increase in motion (e.g., a change in a scene causing a low complexity multimedia picture to be replaced with a high complexity multimedia picture), an increase in a texture content associated with multimedia picture, and the like. The increase in motion requires more bits when compared to static multimedia sequences. The increase in the texture content of the multimedia picture may be due to, for example, multimedia panning (e.g., horizontal or vertical panning), new objects entering the multimedia sequence, and the like.

However, for heterogeneous multimedia sequences, the complexity varies from one multimedia picture to another, and using instantaneous complexity for every multimedia picture may lead to spurious complexity variations. In an embodiment, in order to avoid the occurrence of spurious complexity variations, a weighted average complexity is determined for a plurality of multimedia pictures. The weighted average complexity is given by the following Equation 1:

$$C_w(n)=w*C(n)+(1-w)*C_w(n-1) \forall n \geq 0 \quad (1)$$

wherein w is a weight factor, $C_w(n)$ and $C_w(n-1)$ are the weighted average complexity of the multimedia pictures n and n−1, respectively, C(n) is the instantaneous complexity of the multimedia picture n, and $G_w(-1)=0$. In an embodiment, the weight factor defines an extent of contribution of complexity of each of the multimedia pictures to the weighted average complexity of the multimedia picture. In an embodiment, the weight factor also defines a number of multimedia pictures contributing significantly to the weighted average complexity or duration of complexity considered for determining the weighted average complexity. In an embodiment, a higher value for the weight factor correlates to a lower number of multimedia pictures contributing to the weighted average complexity of the plurality of multimedia pictures, as well as to a lower duration of complexity considered for determining the weighted average complexity. In an embodiment, the complexity determination engine 102 is configured to determine a local complexity and a global complexity associated with a multimedia picture from among the plurality of multimedia pictures. The local complexity is determined over a first complexity duration and corresponds to a complexity associated with the multimedia picture (e.g., a current multimedia picture) and one or more multimedia pictures preceding the multimedia picture (e.g., the current multimedia picture) and/or one or more multimedia pictures succeeding the multimedia picture (e.g., the current multimedia picture). In an embodiment, the local complexity is a weighted average complexity of the multimedia picture, and the one or more multimedia pictures preceding the multimedia picture and/or the one or more multimedia pictures succeeding the multimedia picture. The local complexity is given by the following Equation 2:

$$C_w^{lc}(n)=w_{lc}*C(n)+(1-w_{lc})*C_w^{lc}(n-1) \forall n \geq 0 \quad (2)$$

wherein, $C_w^{lc}(n)$ and $C_w^{lc}(n-1)$ are the weighted average local complexity of multimedia pictures n and n−1 of multimedia data, respectively, C(n) is the instantaneous complexity of the multimedia picture n, and $w_{lc}$ is a weight factor corresponding to the local complexity based on the first complexity duration. The weight factor corresponding to the local complexity defines an extent of contribution of complexity of each of the one or more multimedia pictures preceding the multimedia picture and/or one or more multimedia pictures succeeding the multimedia picture to the local complexity.

The global complexity is determined over a second complexity duration and corresponds to a complexity associated with the multimedia picture (e.g., the current multimedia picture) and at least one of a plurality of multimedia pictures preceding the multimedia picture (e.g., the current multimedia picture) and a plurality of multimedia pictures succeeding the multimedia picture (e.g., the current multimedia picture). In an embodiment, the global complexity is a weighted average complexity of the multimedia picture (e.g., the current multimedia picture) and a plurality of multimedia pictures. The plurality of multimedia pictures includes a plurality of multimedia pictures succeeding the multimedia picture (e.g., the current multimedia picture) and/or a plurality of multimedia pictures preceding the multimedia picture (e.g., the current multimedia picture). The global complexity is given by the following Equation 3:

$$C_w^{gc}(n)=w_{gc}*C(n)+(1-w_{gc})*C_w^{gc}(n-1) \forall n \geq 0 \quad (3)$$

wherein, $C_w^{gc}(n)$ and $C_w^{gc}(n-1)$ are the weighted average global complexity of multimedia pictures n and n−1 of the multimedia data, respectively, C(n) is the instantaneous complexity of multimedia picture n, and $w_{gc}$ is a weight factor corresponding to the global complexity based on the second complexity duration. The weight factor corresponding to the global complexity defines an extent of contribution of each of the plurality of multimedia pictures succeeding the multimedia pictures and/or a plurality of multimedia pictures preceding the multimedia picture. The first complexity duration may be smaller than the second complexity duration. In an embodiment, the first complexity duration is around $\frac{1}{5}^{th}$ of the second complexity duration.

In an embodiment, the weight factor corresponding to the local complexity is greater than the weight factor corresponding to the global complexity. In an exemplary scenario, for a complexity duration of 7.5 seconds, the weight factor corresponding to the local complexity is 0.099 and the weight factor corresponding to the global complexity is 0.023. Similarly, for a complexity duration of 1 minute, the weight factor corresponding to the local complexity is 0.0127 and the weight factor corresponding to the global complexity is 0.0025. It can be observed from the exemplary scenario that the weight factors corresponding to the local complexity and the global complexity decrease when there is an increase in the complexity duration.

In an embodiment, the weight factor is determined using one or more techniques known in the art. In an embodiment, it is assumed that a multimedia picture stops contributing to the weighted average complexity once the contribution reduces to less than $x^{th}$ of an actual complexity, with x being a relatively small value (e.g., 0.01). In an embodiment, for a weight factor w, after the first multimedia picture, the contribution of a complexity C towards the weighted average complexity is w*C, and after n multimedia pictures, the contribution of a complexity C towards the weighted average complexity is $w*(1-w)^{(n-1)}*C$. For optimal performance during encoding, the weight factor is selected such that after n multimedia pictures the contribution of complexity of a multimedia picture should be less than x*w*C, thereby implying that $w*(1-w)^{(n-1)}*C$ is less than x*w*c and that w is greater than $1-e^{\log(x)/n-1}$. Hence, in an embodiment, a weight factor equal to $1-e^{\log(x)/n-1}$ is used to ensure that the complexity decreases to lower than $x^{th}$ of the actual complexity after n multimedia pictures, with n being a particular number of multimedia pictures to be considered for the complexity.

In an embodiment, the complexity determination engine 102 is configured to compare the local complexity and the global complexity measures based on a predetermined criterion to determine the change in the complexity of the multimedia pictures in the multimedia sequence based on the comparison. The predetermined criterion may include, for example, the local complexity exceeding the global complexity by a predetermined amount. The predetermined amount may include, for example, a product of the global complexity and a threshold. For example, in an embodiment, when the local complexity of the multimedia picture increases beyond twice the global complexity then the complexity of the multimedia picture is said to be increasing. Similarly, in an embodiment, when the local complexity of the multimedia picture decreases below half of the global complexity, then the complexity of the multimedia picture is said to be decreasing.

In an embodiment, the bit rate engine 104 is configured to adjust a bit rate for encoding the multimedia picture based on the change in complexity of the multimedia picture. In an embodiment, the bit rate engine 104 increases the bit rate on determining an increase in complexity of the multimedia picture and/or decreases the bit rate on determining a decrease in complexity of the multimedia picture. The utilization of additional bits during a corresponding increase in the bit rate and/or saving of bits during a corresponding decrease in the bit rate is compensated by adjusting of bit rates for encoding subsequent multimedia pictures in the multimedia sequence.

In an embodiment, the bit rate engine 104 adjusts the bit rate to achieve a predetermined target bit rate for encoding. In an embodiment, the bit rate engine 104 increases the bit rate above the predetermined target bit rate when an increase in complexity of the multimedia picture is determined. In an embodiment, the increase in the bit rate is proportional to the increase in the complexity. In an embodiment, the bit rate engine compensates the utilization of the additional bits during the corresponding increase in the bit rate by decreasing the bit rate upon determining a decrease in complexity of a subsequent multimedia picture. In an embodiment, the bit rate is decreased for a duration until all additional bits consumed during the increase of the bit rate are compensated.

In an embodiment, the bit rate engine 104 decreases the bit rate below the predetermined target bit rate when a decrease in complexity of the multimedia picture is determined. In an embodiment, the decrease in the bit rate is proportional to the decrease in the complexity. In an embodiment, the bit rate engine 104 compensates the saving of bits during the corresponding decrease in the bit rate by increasing the bit rate upon determining an increase in complexity of a subsequent multimedia picture. Adjusting the bit rate is explained further in FIG. 2.

In an embodiment, the system 100 additionally includes other components (not shown in FIG. 1), such as, for example, an input unit (e.g., a video processing device), a video display unit (e.g., liquid crystals display (LCD), a cathode ray tube (CRT), and the like), a cursor control device (e.g., a mouse), a drive unit (e.g., a disk drive), a signal generation unit (e.g., a speaker) and/or a network interface unit. The input unit is operable to transfer multimedia data to the complexity determination engine 102 and the bit rate engine 104 for the encoding of multimedia data. The drive unit includes a machine-readable medium upon which is stored one or more sets of instructions (e.g., software) embodying one or more of the methodologies and/or functions described herein. In an embodiment, the software resides, either completely or partially, within the memory 106 and/or within the complexity determination engine 102 and/or the bit rate engine 104 during the execution thereof by the system 100 such that the memory 106, the complexity determination engine 102, and/or the bit rate engine 104 also constitute machine-readable media.

The software may further be transmitted and/or received over a network via the network interface unit. The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions for execution by the system 100 and that cause the system 100 to perform one or more of the methodologies of the various embodiments. Furthermore, the term "machine-readable medium" may be construed to include, but shall not be limited to, solid-state memories, optical and magnetic media, and carrier wave signals.

Figure 2:
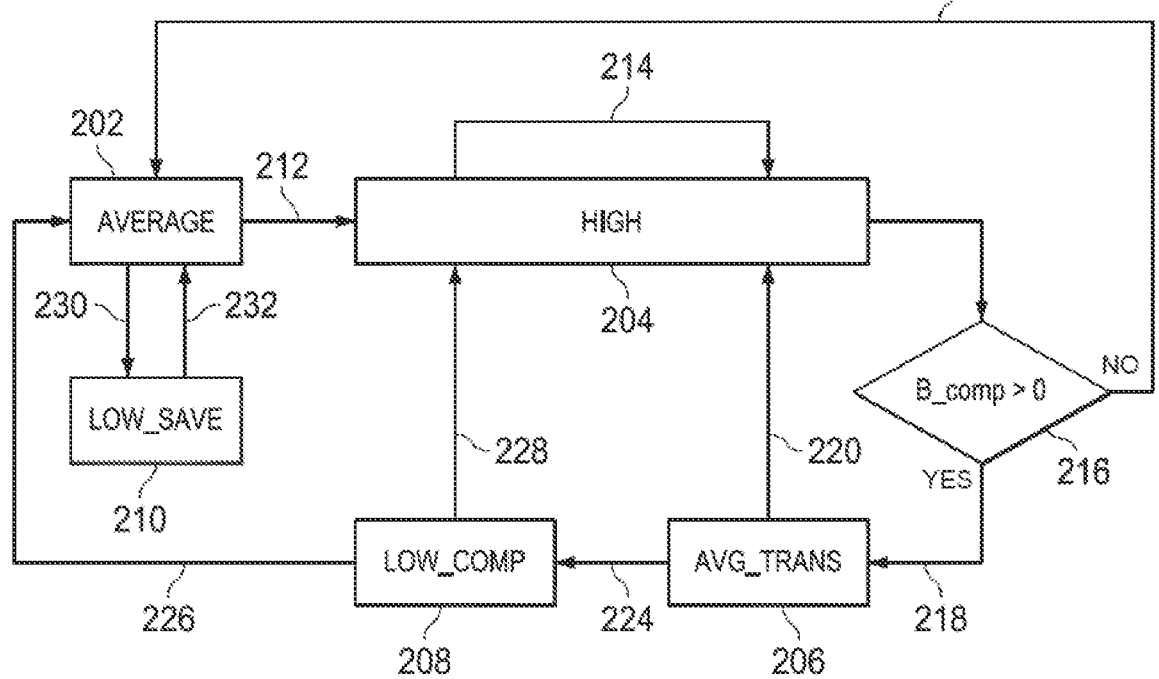
FIG. 2 is a simplified overview of a process flow illustrating a plurality of states of operation of the system of FIG. 1 according to an embodiment.

FIG. 2 is a simplified overview of a process flow illustrating a plurality of states of operation of the system 100 of FIG. 1 according to an embodiment. In FIG. 2, the plurality of states of operation is represented by blocks 202-210. In an embodiment, the plurality of states of operation include, but are not limited to, an average (AVG) state 202, a high complexity (HIGH) state 204, a transition (AVG_TRANS) state 206, a low compensating (LOW_COMP) state 208, and a low complexity (LOW_SAVE) state 210. In the AVG state 202, the multimedia pictures are encoded at a bit rate equal to a predetermined target bit rate (R). It is noted that the terminology "bit rate" may be construed, for example, as referring to an average bit rate to be achieved over a short duration of the multimedia sequence, wherein the short duration is of the order of a few seconds of the multimedia sequence.

The bit rate is set to a value between a minimum bit rate (R_min) and a maximum bit rate (R_max). R_max is an upper bound on the bit rate and the R_min is a lower bound on the bit rate. Also, it is noted that the terminology "predetermined target bit rate" may be construed, for example, as referring to a bit rate to be achieved during a predetermined duration of a multimedia sequence associated with multimedia data during the encoding of the multimedia data. The predetermined duration varies from a few seconds to a few hours. When the system 100 operates in the High state 204, the bit rate of encoding the multimedia pictures is increased beyond R. Moreover, when the system 100 operates in the LOW_COMP state 208, the bit rate of encoding the multimedia pictures is lower than R to thereby compensate for the excess bits consumed during HIGH state 204. Furthermore, when the system 100 operates in the LOW_SAVE state 210, the bit rate of encoding is lower than R to thereby save bits for later use upon subsequently entering the HIGH state 204. During the AVG_TRANS state 206, the bit rate of encoding is R. The AVG_TRANS state 206 serves as a state of transition between the HIGH state 204 and LOW_COMP state 208 to thereby enable a gradual transition of bit rates during the encoding of multimedia pictures.

In an embodiment, initially, the system 100 begins operating in the AVG state 202 with the bit rate (B) of encoding the multimedia pictures set to R. When an increase in complexity is detected (e.g., by using the complexity determination engine 102 of FIG. 1) at 212, the system 100 transitions to the HIGH state 204 and B is increased (e.g., by using the bit rate engine 104 of FIG. 1) beyond R. The increase in B is dependent upon an amount of change in complexity between the AVG state 202 and the HIGH state 204. B is set to a value between R and R_max during the HIGH state 204. The increase in complexity is determined if a local complexity (LC) increases relative to the global complexity (GC) such that "LC is greater than GC*TH", where TH is a first threshold. An exemplary value of TH includes, but is not limited to, 1.5. In an embodiment, a sensitivity factor (alpha) is used to control an amount by which the B is increased when transitioning to the HIGH state 204. In an embodiment, alpha is set to a value between 1.0 and R_max/R. In an embodiment, a higher value of alpha indicates a usage of a higher B during the HIGH state 204. During the HIGH state 204, B is increased to "R*alpha*LC/GC".

Also, during the HIGH state 204, as B is increased, an excess number of bits are consumed. The excess number of bits consumed is saved as B_comp (not shown in FIG. 2). Initially, during the AVG state 202, B_comp is set to 0. B_comp is updated during the HIGH state 204 to record the additional number of bits consumed (for example, bits in addition to the number of bits at bit rate=R). During the HIGH state 204, B_comp is updated to:

"$B\_comp+=B\_current-B\_target$", where B_current is a number of bits consumed for a current multimedia picture and B_target is a target number of bits per multimedia picture. Additionally, in an embodiment, the system 100 transitions from the HIGH state 204 to the HIGH state 204 at 214 by further increasing B, if a further increase in the complexity is observed, such that LC increases significantly compared to GC. B is further increased by an amount equal to "R*alpha*LC/GC".

In an embodiment, the complexity of the multimedia sequence is subsequently reduced such that the LC is less than GC*TL, where TL is a second threshold. An exemplary value of TL lies between 0.875 and 1.125. At 216 it is determined whether B_comp is greater than 0. B_comp being greater than 0 indicates a consumption of an excess number of bits during the HIGH state 204. If B_comp is greater than 0, then, at 218, the system 100 transitions to the AVG_TRANS state 206 and B is reduced to R. In an embodiment, the system 100 continues to operate in the AVG_TRANS state 206 for a predetermined number of multimedia pictures (Num_trans) until a variable (Natrans) equates the Num_trans to thereby enable a gradual transition of bit rate for the encoding of multimedia pictures. In an exemplary embodiment, Num_trans is set to 15. In an embodiment, if an increase in complexity of the multimedia sequence is determined during the AVG_TRANS state 206, such that LC is greater than GC*TH, then, at 220, the system 100 transitions back to the HIGH state 204. Furthermore, it is noted that B is increased to "R*alpha*LC/GC".

Alternatively, at 216, if B_comp is less than 0, thereby indicating that no additional bits are consumed during the HIGH state 204, and if the complexity of the multimedia sequence reduces such that the LC is less than GC*TH, then, at 222, the system 100 transitions to the AVG state 202 from the HIGH state 204, and B is decreased to "R".

In an embodiment, at 224, the system 100 transitions to the LOW_COMP state 208 from the AVG_TRANS state 206 when Natrans equates to Num_trans to compensate for the additional number of bits consumed during the HIGH state 204. B is set to "R*beta*LC/GC", where beta is a sensitivity factor for determining an amount by which the bit rate is decreased to thereby compensate for the additional number of bits previously consumed. In an embodiment, during the LOW_COMP state 208, B is set to a value between R and R_min. The system 100 continues to operate in the LOW_COMP state 208 until all the additional bits consumed during the HIGH state 204 are compensated and such that the predetermined target bit rate is achieved over a predetermined duration of the multimedia sequence.

In an embodiment, B_comp is decremented and updated such that B_comp is "B_target-B_current". The LOW_COMP state 208 ensures that B is not drastically reduced. Subsequent to the operation in the LOW_COMP state 208, at 226, the system 100 returns back to the AVG state 202 when a compensation has been implemented for the excess bits consumed (B_comp<0).

In an embodiment, at 228, the system 100 transitions from the LOW_COMP state 208 to the HIGH state 204, if the complexity of the multimedia sequence increases during the LOW_COMP state 208, such that LC is greater than GC*TH, and the B is increased to "R*alpha*LC/GC". In an embodiment, at 230, the system 100 transitions from the AVG state 202 to a LOW_SAVE state 210, by reducing the target bit rate below the average value, when the complexity reduces drastically, such that LC is less than GC*T_ls, where T_ls is a third threshold value. An exemplary value of T_ls includes, but is not limited to, 0.5. B is reduced to R*beta*LC/GC, and bits are saved up for subsequent usage in the HIGH state 204. B_comp is updated to B_target-B_current. In an embodiment, the B is set to a value between R_min and R during the LOW_SAVE state 210 and the LOW_COMP state 208. In an embodiment, the complexity increases in the LOW_SAVE state 210 such that LC is greater than GC*Ta, where Ta is a fourth threshold value. An exemplary value of Ta lies between 0.6 and 0.75. In an embodiment, at 232, the system 100 transitions back to the AVG state 202.

As explained earlier in the description of FIG. 1, and in accordance with a number of exemplary scenarios, the value of weight factors corresponding to the local complexity and the global complexity decreases with the increase in the complexity duration. For example, for a complexity duration of 7.5 seconds, the weight factor corresponding to the local complexity is 0.099, and the weight factor corresponding to the global complexity is 0.023, while, for a complexity duration of 1 minute, the weight factor corresponding to the local complexity is 0.0127, and the weight factor corresponding to the global complexity is 0.0025. As the complexity duration increases (e.g., >>1 minute), the values of weight factors corresponding to the local complexity and the global complexity further decrease.

In floating point systems, computations associated with complexity are performed using the weight factors with at most accuracy even for very low values of the weight factors corresponding to the local complexity and the global complexity. However, in fixed point systems, for large complexity durations, the computations performed using the very low values of the weight factors corresponding to the local complexity and the global complexity may tend to be inaccurate. In an embodiment, in fixed point systems, fixed weight factors for a small duration on the order of a few seconds or a few minutes are used to determine the complexity of multimedia pictures of large complexity durations. The multimedia data associated with a multimedia sequence is sampled at fixed intervals, and complexities of one or more multimedia pictures associated with the sampled multimedia data are determined using the fixed weight factors for determining change in complexity of one or more multimedia pictures associated with the sampled multimedia data. Sampling of the multimedia data is described further in FIGS. 3A and 3B. In an embodiment, instantaneous complexities of the sampled multimedia pictures may be determined. In an embodiment, a change in complexity of one or more multimedia pictures associated with the sampled multimedia data relative to one or more multimedia pictures associated with previously sampled multimedia data is determined. A bit rate of encoding the multimedia data is adjusted based on the change in complexity.

Figures 3A, 3B:
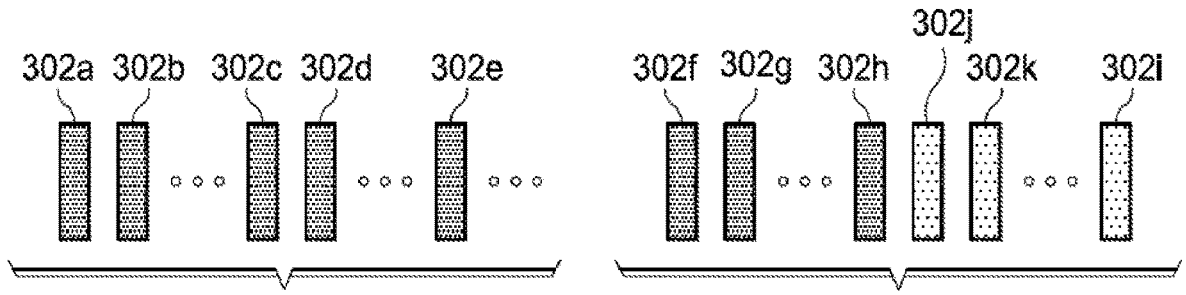
FIGS. 3A and 3B illustrate an exemplary scenario of sampling multimedia data for a large complexity duration in a fixed point system according to an embodiment.

FIGS. 3A and 3B illustrate an exemplary scenario of sampling multimedia data for a large complexity duration in a fixed point system according to an embodiment. The large complexity duration is, for example, x minutes (e.g., >>1 minute). The multimedia data associated with multimedia pictures are sampled at the rate of x minutes. FIG. 3A illustrates multimedia pictures 302a, 302b, 302c, 302d, and 302e. The multimedia pictures 302a and 302b are sampled at, for example, the $x^{th}$ instant and the $2x^{th}$ instant, respectively. The multimedia pictures 302c and 302d are sampled at, for example, the $4x^{th}$ instant and the $5x^{th}$ instant, respectively, and multimedia picture 302e is sampled at, for example, the $10x^{th}$ instant. In an embodiment, the state transitions (explained in FIG. 2) for the system 100 are performed at every $nx^{th}$ instant by sampling the multimedia pictures at the rate of x and determining the complexity of the multimedia pictures sampled at every $(nx)^{th}$ instant. The complexity of each of the sampled multimedia pictures 302a, 302b, 302c, 302d, and 302e are determined using fixed weights factors corresponding to, for example, 1 minute. In an embodiment, the complexity duration of the fixed weight factors may be equal to the duration of each of the sampled multimedia pictures. In an embodiment, a local complexity and a global complexity for each of the sampled multimedia picture is determined.

In an exemplary scenario, a change in complexity of the multimedia pictures between the two consecutively sampled multimedia pictures is neglected if the change is minimal. In multimedia pictures, where the change in complexity of the multimedia pictures between the two consecutively sampled multimedia pictures is not negligible, an average complexity of multimedia pictures in between the two consecutively sampled multimedia pictures is considered to determine the change in complexity of the sampled multimedia pictures for transitioning to various states. In an embodiment, the average complexity corresponds to an average value of complexity of a plurality of multimedia pictures and the sampled multimedia picture, wherein the plurality of multimedia pictures includes a plurality of multimedia pictures preceding the sampled multimedia picture and/or succeeding a previously sampled multimedia picture. The average complexity is determined to determine the change in complexity of the sampled multimedia picture relative to complexity associated with one or more multimedia pictures in the multimedia sequence. The average complexity for an $nx^{th}$ multimedia picture is given by the following Equation 4:

$$C_{nx} = \left(\frac{1}{x}\right) \sum_{i=(n-1)x+1}^{nx} C_i \qquad (4)$$

where $C_{nx}$ is the average complexity of "n" multimedia pictures and C is the complexity associated with a multimedia picture i, with i being a positive integer and x corresponding to the duration of the complexity.

FIG. 3B illustrates multimedia pictures 302f, 302g, 302h, and 302i, which are sampled at consecutive $(nx)^{th}$ instances. In an embodiment, the complexity of multimedia picture 302i is determined (e.g. using complexity determination engine 102 of FIG. 1) based on an average value of complexity of multimedia pictures 302j, 302k and one or more intermediate multimedia pictures (not shown in FIG. 3B) up to the multimedia picture 302i. In an embodiment, a change in complexity of the multimedia picture 302i relative to complexity associated with the multimedia pictures 302j, 302k is determined based on the complexity of the multimedia picture 302i.

According to various embodiments, the system 100 disclosed herein enables optimal utilization of bits for encoding multimedia data by achieving a predetermined target bit rate over a predetermined duration of the multimedia sequence, thereby maximizing a perceptual multimedia quality. The perceptual multimedia quality is assessed based on visible artefacts caused by degradation of decoded multimedia data due to the encoding or decoding processes.

Figure 4:
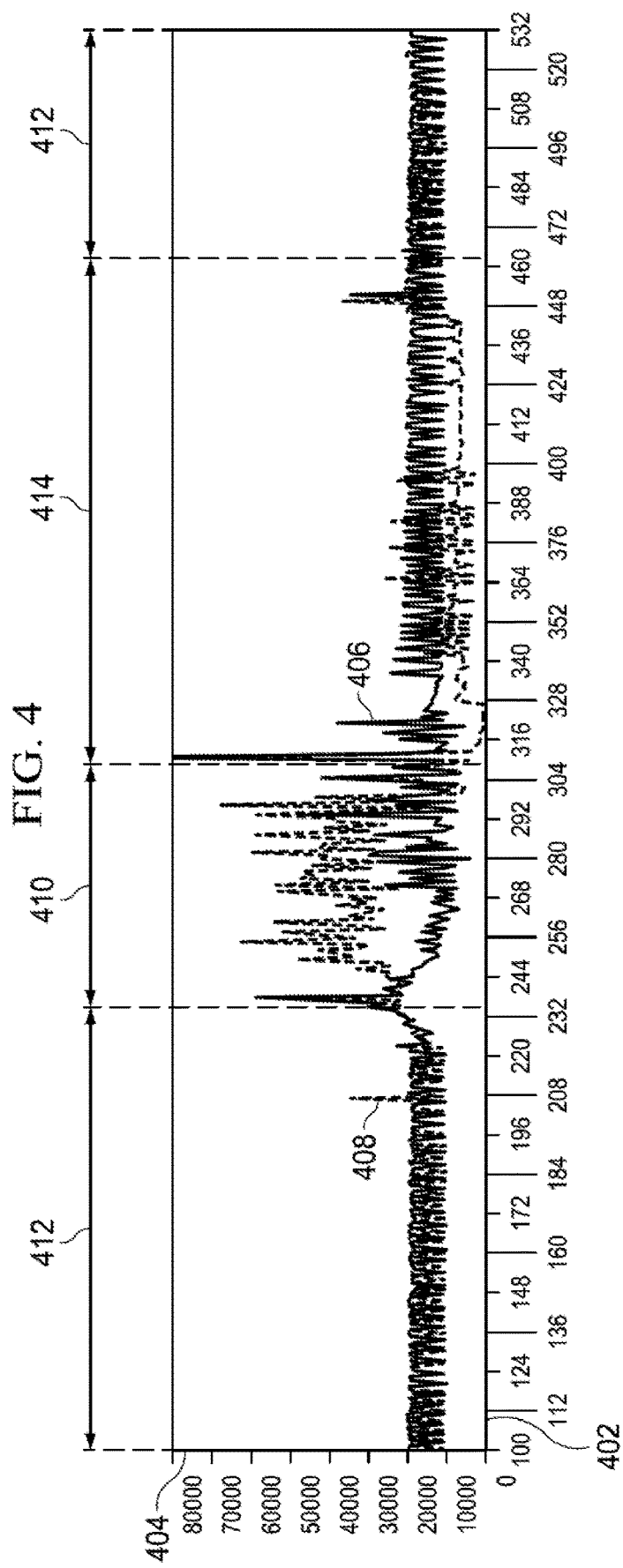
FIG. 4 illustrates exemplary bit rate traces for encoding multimedia data pursuant to an exemplary scenario.

FIG. 4 illustrates exemplary bit rate traces for the encoding of multimedia data pursuant to an exemplary scenario. A bit rate trace is a plot of a variation in a number of bits consumed during the encoding of a plurality of pictures corresponding to the multimedia data. In FIG. 4, a reference index of pictures corresponding to the multimedia is plotted on the X-axis 402, and the corresponding number of bits consumed is plotted on the Y-axis 404. In FIG. 4, a first bit rate trace 406 corresponds to a scenario where a bit rate is maintained at a predetermined target bit rate (for example, a predetermined average bit rate) irrespective of the change in complexity of the pictures being encoded. A second bit trace 408 corresponds to a scenario where a bit rate is adjusted based on a determined change in complexity of the pictures corresponding to the multimedia data (for example, by system 100 as explained in FIGS. 1 and 2). In an embodiment, the bit trace depicted in FIG. 4 may correspond to multimedia data, such as a video surveillance sequence for a surveillance application. In an embodiment, a predetermined target bit rate trace is 500 kilobits per second (kbps).

In FIG. 4, a utilization of a higher number of bits for encoding is observed from picture ref #240 to picture ref #300, which may correspond to a high activity period 410. No other activity is observed in the multimedia data barring the high activity period 410 from picture ref #240 to picture ref #300. In an embodiment, the high activity period 410 may correspond to an instance of a person walking across a video surveillance camera capturing the surveillance data.

Since there is no activity from picture ref #100 to picture ref #239, the first bit trace 406 and the second bit rate trace 408 follow similar plots, thereby indicating a utilization of an average bit rate of encoding of the multimedia data. The period of operation from picture ref #100 to picture ref #239 corresponds to an average activity period 412. The average activity period 412 corresponds to the AVG state 202 of operation of the system 100, as explained in FIG. 2. When a complexity corresponding to the multimedia data begins to increase at picture 240 (as a result of an increase in activity), the second bit rate trace 408 indicates a transition to a higher bit rate than the predetermined target bit rate (for example, a transition to the HIGH state 204 from the AVG state 202 of system 100), whereas the first bit rate trace 406 is maintained at the predetermined target bit rate.

After the activity ceases (with the corresponding decrease in complexity) at picture ref #300, the first bit rate trace 408 indicates a transition to a lower bit rate than the predetermined target bit rate (for example, a transition to the LOW_COMP state 208 from the HIGH state 204 of system 100). The lower bit rate is maintained until picture 465, wherein a compensation is implemented for all of the excess number of bits utilized during the transition to the higher bit rate. The period of operation from picture ref #300 to picture ref #465 corresponds to a low activity period 414. It is noted that a number of bits consumed from picture ref #300 to picture ref #465 for the second bit rate trace 408 are less than the number of bits consumed over the same period for the first bit trace 406. The predetermined target bit rate of encoding is utilized for the second bit trace 408 from picture ref #465 onwards that corresponds to the average activity period 412 (for example, a transition to the AVG state 202 from the LOW_COMP state 208 of system 100). Adjusting the bit rate based on a change in complexity of a multimedia picture relative to complexity associated with one or more multimedia pictures in a multimedia sequence may improve a perceptual quality of the multimedia data. This is further illustrated in FIGS. 5A-5D.

Figure 5A:
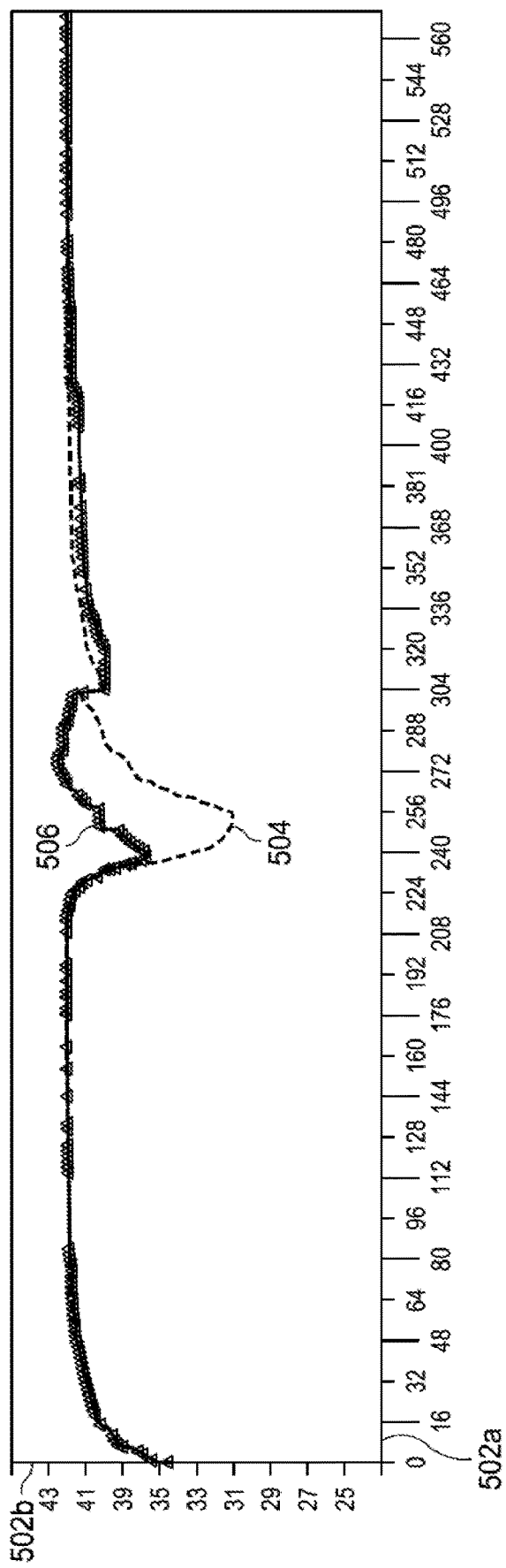

FIG. 5A illustrates peak signal to noise ratio (PSNR) traces corresponding to the first bit rate trace 406 and the second bit rate trace 408 of FIG. 4 according to an embodiment. A PSNR trace is a plot of PSNR observed across a plurality of pictures corresponding to the multimedia data. In FIG. 5A, a reference index of pictures corresponding to the multimedia is plotted on the X-axis 502$a$, and the corresponding PSNR is plotted on the Y-axis 502$b$. In FIG. 5A, a PSNR trace 504 corresponds to a plot of variation in PSNR observed for a bit rate of encoding corresponding to the first bit rate trace 406, and a PSNR trace 506 corresponds to a plot of variation in PSNR observed for a bit rate of encoding corresponding to the second bit rate trace 408.

It can be observed that the PSNR trace 506 corresponding to the second bit rate trace 408 achieves a significantly higher PSNR in the duration of higher activity (e.g., picture ref #240-300) when compared to the PSNR trace 504 corresponding to the first bit rate trace 406. A PSNR drop to 33 dB is observed for the PSNR trace 504 in the high activity period 410. The PSNR stays above 38 dB for the PSNR trace 502 during the high activity duration 410. As illustrated in FIG. 5A, the encoding performed by adjusting the bit rate based on the determined change in complexity of the pictures (for example, by using system 100) improves the PSNR, and, hence, perceptual multimedia quality is improved.

Figure 5B:
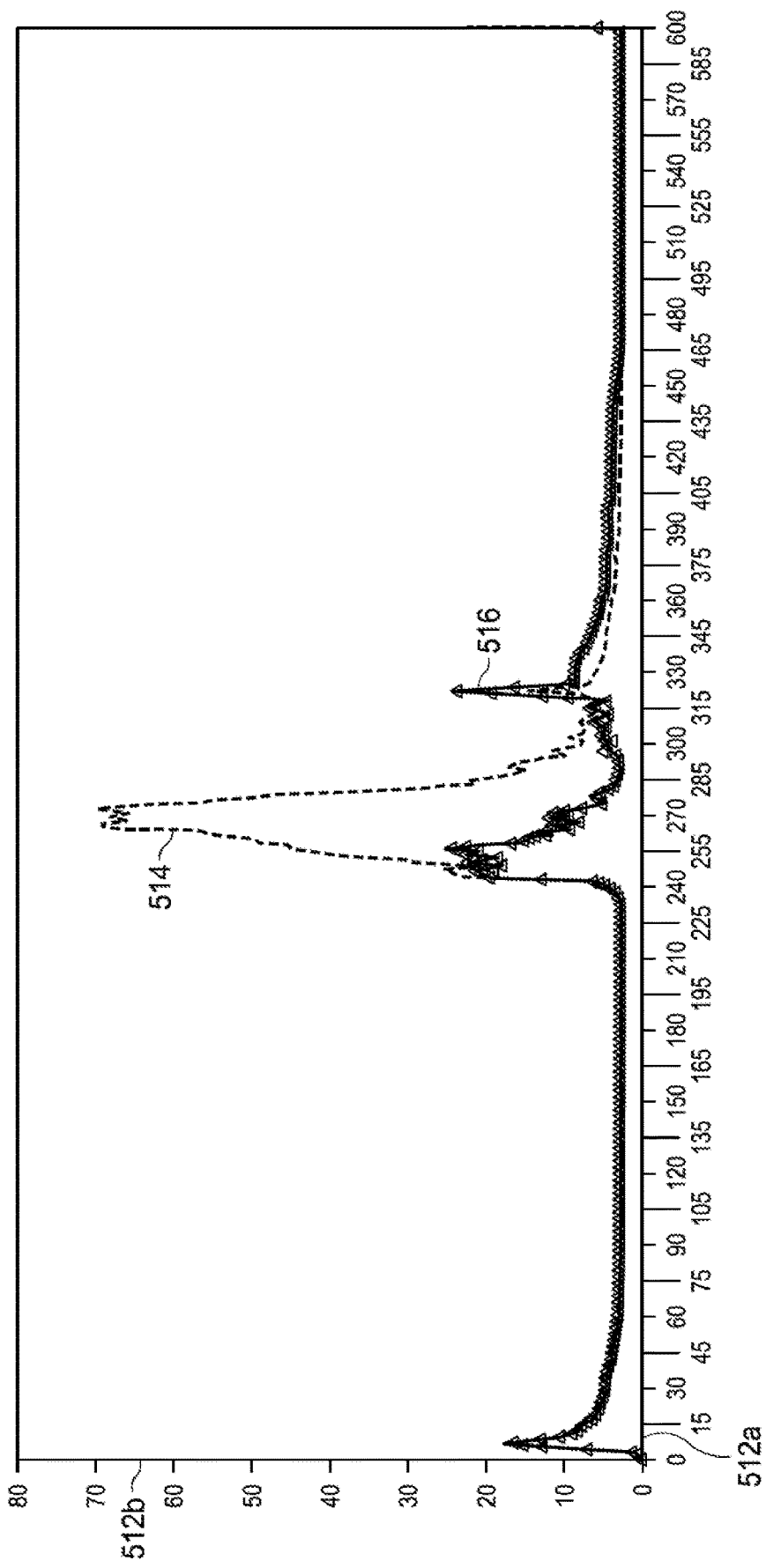

FIG. 5B illustrates difference mean opinion score (DMOS) traces corresponding to the first bit rate trace 406 and the second bit rate trace 408 of FIG. 4 according to an embodiment. A DMOS trace is a plot of DMOS observed across a plurality of pictures corresponding to the multimedia data. In FIG. 5B, a reference index of pictures corresponding to the multimedia is plotted on the X-axis 512$a$ and the corresponding PSNR is plotted on the Y-axis 512$b$. In FIG. 5B, a DMOS trace 514 corresponds to a plot of variation in DMOS observed for a bit rate of encoding corresponding to the first bit rate trace 406, and a DMOS trace 516 corresponds to a plot of variation in DMOS observed for a bit rate of encoding corresponding to the second bit rate trace 408.

It can be observed that the DMOS trace 516 corresponding to the second bit rate trace 408 achieves significantly lower DMOS in the duration of higher activity (e.g., picture ref #240-300) when compared to the DMOS trace 514 corresponding to the first bit rate trace 406. In case of a DMOS trace, lower DMOS values indicate better perceptual multimedia quality. As illustrated in FIG. 5B, the encoding performed by adjusting the bit rate based on the determined change in complexity of the pictures (for example, by using system 100) improves the DMOS, and, hence, perceptual multimedia quality is improved.

FIG. 5C illustrates a plot of variation in PSNR for a plurality of bit rates for (1) a scenario where a bit rate is maintained at a predetermined target bit rate irrespective of the change in complexity of pictures being encoded and (2) a scenario where a bit rate is adjusted based on a determined change in complexity of the pictures corresponding to the multimedia data according to a embodiment. In FIG. 5C, a bit rate (measured in kbps) is plotted on the X-axis 522$a$ and the corresponding PSNR (measured in decibels) is plotted on the Y-axis 522$b$. In FIG. 5C, a plot 524 corresponds to a plot of variation in PSNR for a plurality of bit rates for a scenario where a bit rate is maintained at a predetermined target bit rate irrespective of the complexity of pictures being encoded, and a plot 526 corresponds to a plot of variation in PSNR for a plurality of bit rates for a scenario where a bit rate is adjusted based on a determined change in complexity of the pictures corresponding to the multimedia data. As illustrated in FIG. 5C, for the bit rates ranging from 200 to 500, the PSNR is improved by more than 0.3 dB for all bit rates for plot 526 as compared to plot 524.

FIG. 5D illustrates a plot of variation in DMOS for a plurality of bit rates for (1) a scenario where a bit rate is maintained at a predetermined target bit rate irrespective of change in complexity of pictures being encoded and (2) a scenario where a bit rate is adjusted based on a determined change in complexity of the pictures corresponding to the multimedia data according to a embodiment. In FIG. 5D, a bit rate (measured in kbps) is plotted on the X-axis 532$a$, and the corresponding DMOS is plotted on the Y-axis 532$b$. In FIG. 5D, a plot 534 corresponds to a plot of variation in DMOS for a plurality of bit rates for a scenario where a bit rate is maintained at a predetermined target bit rate irrespective of the complexity of pictures being encoded, and a plot 536 corresponds to a plot of variation in DMOS for a plurality of bit rates for a scenario where a bit rate is adjusted based on a determined change in complexity of the pictures corresponding to the multimedia data. As illustrated in FIG. 5D, an overall DMOS is lowered by more than 20 at 200 kbps for plot 536 as compared to plot 534. Thus, FIGS. 5A-5D illustrate that a perceptual multimedia quality is improved when a bit rate is adjusted based on a change in complexity of a picture corresponding to multimedia data as compared to a scenario where a bit rate is maintained at a predetermined target bit rate irrespective of variations in complexity of the pictures.

Figure 6:
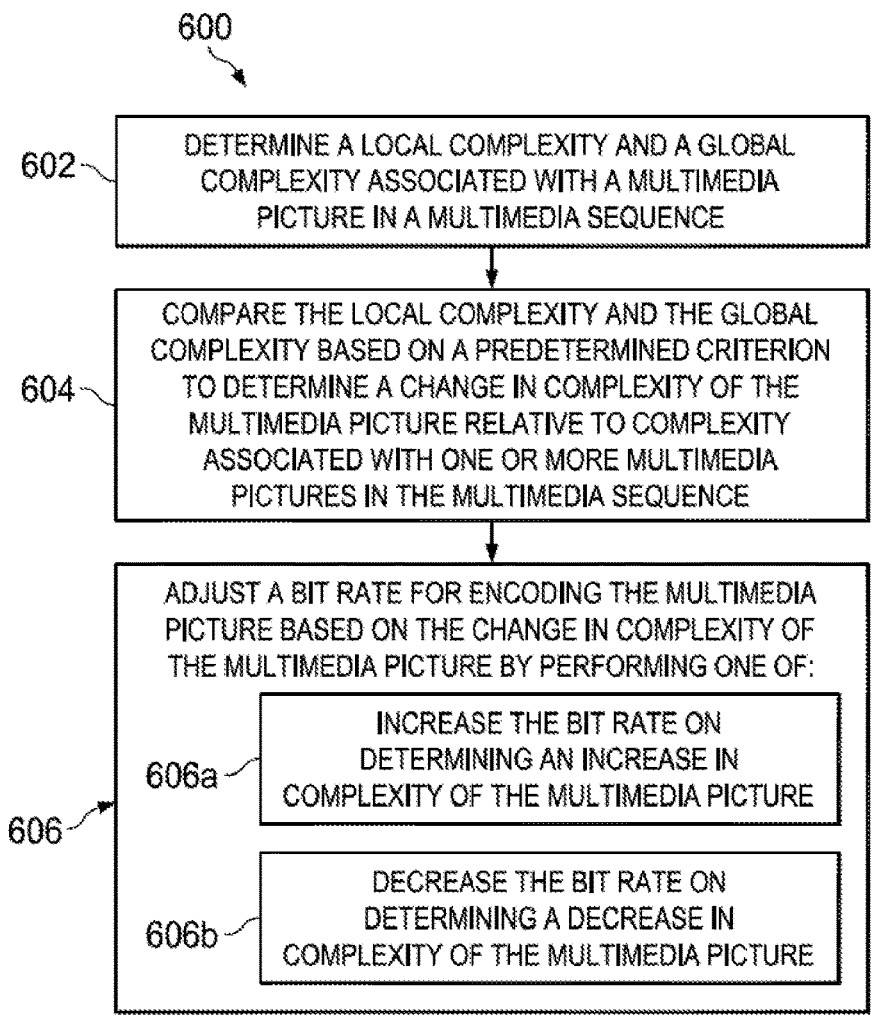
FIG. 6 is a flow chart of a method of bit rate control according to an embodiment.

FIG. 6 is a flow chart 600 of a method of bit rate control during encoding multimedia data associated with a multimedia picture according to an embodiment. Examples of multimedia data include, but are not limited to, video data, and the like. The multimedia picture may be associated with a multimedia sequence. Each multimedia sequence may include one or more multimedia pictures. An example of a multimedia sequence is a collection of consecutive multimedia pictures with all multimedia pictures in the multimedia sequence belonging to the same or different scene. As illustrated in FIG. 6, in operation 602, a local complexity and a global complexity associated with the multimedia picture in a multimedia sequence is determined. The local complexity is determined over a first complexity duration and corresponds to a complexity associated with the multimedia picture (e.g., a current multimedia picture) and one or more multimedia pictures preceding the multimedia picture (e.g., the current multimedia picture) and/or one or more multimedia pictures succeeding the multimedia picture (e.g., the current multimedia picture). The global complexity is determined over a second complexity duration and corresponds to a complexity associated with the multimedia picture and a plurality of multimedia pictures preceding the multimedia picture and/or a plurality of multimedia pictures succeeding the multimedia picture. In an embodiment, the first complexity duration is smaller than the second complexity duration. In an embodiment, the local complexity and/or the global complexity is determined based on a number of bits and an average quantization associated with the multimedia picture. In an embodiment, the local complexity and the global complexity may be calculated by using Equations 2 and 3 respectively, which are explained above with reference to FIG. 1. In an embodiment, a first weight factor corresponding to the local complexity and a second weight factor corresponding to the global complexity are determined. The first weight factor is determined based on the first complexity duration and defines an extent of contribution of the complexity of each of the one or more multimedia pictures preceding the multimedia picture and/or one or more multimedia pictures succeeding the multimedia picture to the local complexity. The second weight factor is determined based on the second complexity duration and defines an extent of contribution of the complexity of each of the plurality of multimedia pictures preceding and/or succeeding the multimedia picture to the global complexity.

In an embodiment, in operation 604, the local complexity is compared with the global complexity based on a predetermined criterion to determine a change in complexity of the multimedia picture relative to complexity associated with one or more multimedia pictures in the multimedia sequence. The predetermined criterion may include, for example, the local complexity exceeding the global complexity by a predetermined amount (e.g., LC>GC*TH as described above with reference to FIG. 2). The predetermine amount may include, for example, a product of the global complexity and a threshold (e.g., a first threshold TH, a second threshold TL, a third threshold T_ls, and a fourth threshold Ta with reference to description of FIG. 2). For example, in an embodiment, when the local complexity of the multimedia picture increases beyond twice the global complexity then the complexity of the multimedia picture is said to be increasing. Similarly, in an embodiment, when the local complexity of the multimedia picture decreases below half of the global complexity, then the complexity of the multimedia picture is said to be decreasing.

In an embodiment, in order to encode large complexity durations (of the order of a few minutes to a few hours) in fixed point systems, multimedia data associated with multimedia pictures are sampled at a predetermined rate. The sampling of the multimedia pictures in fixed point systems is as described in the description of FIGS. 3A-3B. The complexity of the multimedia pictures associated with the sampled multimedia data is determined based on a predetermined weight factor for a predetermined complexity duration. In an embodiment, the complexity corresponds to an instantaneously determined complexity of the sampled multimedia data. In an embodiment, a change in complexity of one or more multimedia pictures associated with the sampled multimedia data relative to one or more multimedia pictures associated with previously sampled multimedia data is determined. A bit rate of encoding the multimedia data is adjusted based on the change in complexity.

In an embodiment, during instantaneously determining the complexity, change in complexity of the multimedia pictures between the two consecutively sampled multimedia pictures is neglected if the change is minimal. In multimedia sequences where the change in complexity of the multimedia pictures between the two consecutively sampled multimedia pictures is not negligible, an average complexity of multimedia pictures in between the two consecutively sampled multimedia pictures is considered to determine the change in complexity of the sampled multimedia pictures when transitioning to various states. In an embodiment, the complexity corresponds to an average value of complexity of a plurality of multimedia pictures and the sampled multimedia data. In an embodiment, the plurality of multimedia pictures includes a plurality of multimedia pictures preceding the sampled multimedia data and/or succeeding a previously sampled multimedia data (such as explained in FIG. 3B). In an embodiment, a change in complexity of one or more multimedia pictures associated with the sampled multimedia data relative to one or more multimedia pictures associated with previously sampled multimedia data is determined based on the determined average value of complexity and a bit rate for encoding the multimedia data is adjusted based on the change in complexity.

In an embodiment, in operation 606, a bit rate for encoding the multimedia picture is adjusted based on the change in complexity of the multimedia picture. In an embodiment, the bit rate is adjusted by performing one of increasing the bit rate and decreasing the bit rate. In operation 606a, the bit rate is increased on determining an increase in complexity of the multimedia picture. Alternatively, in operation 606b, the bit rate is decreased on determining a decrease in complexity of the multimedia picture. The utilization of additional bits during a corresponding increase in the bit rate and/or saving of bits during a corresponding decrease in the bit rate is compensated during adjusting of bit rates for encoding subsequent multimedia pictures in the multimedia sequence.

In an embodiment, the bit rate is adjusted to achieve a predetermined target bit rate for encoding multimedia data. It is noted that the terminology "bit rate" may be construed as referring to, for example, an average bit rate to be achieved over a short duration of the multimedia sequence, wherein the short duration is of the order of a few seconds of the multimedia sequence. The bit rate is set to a value between a minimum bit rate (R_min) and a maximum bit rate (R_max). R_max is an upper bound on the bit rate and R_min is a lower bound on the bit rate. Also, it is noted that the terminology "predetermined target bit rate" may be construed as referring to, for example, a bit rate to be achieved during a predetermined duration of a multimedia sequence associated with multimedia data during the encoding of the multimedia data. The predetermined duration varies from a few seconds to a few hours. In an embodiment, the bit rate is increased above a predetermined target bit rate upon determining an increase in complexity of the multimedia picture, wherein the increase in the bit rate is proportional to the increase in the complexity. The utilization of the additional bits during corresponding increase in the bit rate is compensated by decreasing the bit rate upon determining a decrease in complexity of a subsequent multimedia picture. The bit rate is decreased for a duration until all additional bits consumed during the increase of the bit rate are compensated.

Also, in an embodiment, the bit rate is decreased below the predetermined target bit rate upon determining a decrease in complexity of the multimedia picture. The decrease in the bit rate is proportional to the decrease in the complexity. The saving of bits during the corresponding decrease in the bit rate is compensated by increasing the bit rate upon determining an increase in complexity of a subsequent multimedia picture. The saved bits are utilized during a subsequent increase in the complexity of the multimedia pictures. Adjusting the bit rate may be carried out, for example, as explained above in the description of FIG. 2.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various electrical structures and methods may be embodied using transistors, logic gates, and electrical circuits (e.g., application specific integrated circuit (ASIC) circuitry and/or in Digital Signal Processor (DSP) circuitry).

Particularly, in the system 100, the complexity determination engine 102 and the bit rate engine 104 of FIG. 1 may be enabled using software and/or using transistors, logic gates, and electrical circuits (e.g., integrated circuit circuitry such as ASIC circuitry).

Embodiments of the present disclosure include one or more computer programs stored or otherwise embodied on a computer-readable medium, wherein the computer programs are configured to cause a processor to perform one or more operations. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled to each other but may still be indirectly coupled and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system comprising:
a first operating state having a first bit rate;
a second operating state having a second bit rate greater than the first bit rate;
a complexity determination engine configured to determine an increase in complexity of a bit stream of a video sequence; and
a processor configured to:
transition the system from the first operating state to the second operating state in response to the complexity determination engine determining the increase in the complexity of the bit stream; and
in response to the complexity determination engine determining a decrease in the complexity of the bit stream while in the second operating state:
transition the system from the second operating state to the first operating state in response to an excess bit rate less than a threshold; and
in response to the excess bit rate above the threshold:
transition the system from the second operating state to a third operating state, the third operating state having the first bit rate; and
after operating in the third operating state for a predetermined number of pictures, transition the system to a fourth operating state, the fourth operating state having a third bit rate less than the second bit rate.

2. The system of claim 1, wherein:
the increase in complexity is determined when a local complexity increases relative to a global complexity.

3. The system of claim 1, wherein:
a sensitivity factor controls the transition from the first operating state to the second operating state.

4. The system of claim 1, further comprising:
a bit rate engine configured to increase the first bit rate to the second bit rate in response to the system transitioning from the first operating state to the second operating state.

5. The system of claim 1, further comprising:
a bit rate engine configured to decrease the second bit rate to the first bit rate in the third operating state.

6. The system of claim 1, wherein:
the system operates in the fourth operating state until excess bits consumed during the second operating state are compensated and a predetermined target bit rate is achieved over a predetermined duration of the video sequence.

7. The system of claim 6, wherein:
the processor is configured to transition the system from the fourth operating state to the first operating state in response to the excess bits consumed during the second operating state are compensated and the predetermined target bit rate is achieved over the predetermined duration of the video sequence.

8. The system of claim 1, wherein:
the processor is configured to transition the system from the first operating state to a fifth operating state in response to the complexity of the bit stream reduces below a third threshold.

9. The system of claim 8, wherein:
the processor is configured to transition the system from the first operating state to the fifth operating state by reducing a target bit rate below the first bit rate.

10. A non-transitory computer-readable medium comprising instructions that, when executed, cause a computer to:
determine a complexity determination of a bit stream;
transition a first operating state, having a first bit rate, to a second operating state, having a second bit rate, in response to an increase in the complexity determination; and
in response to a decrease in the complexity determination while in the second operating state:
transition from the second operating state to the first operating state in response to an excess bit rate less than a threshold; and
in response to the excess bit rate above the threshold:
transition from the second operating state to a third operating state, the third operating state having the first bit rate; and
after operating in the third operating state for a predetermined number of pictures, transition to a fourth operating state, the fourth operating state having a third bit rate less than the second bit rate.

11. The non-transitory computer-readable medium of claim 10, wherein:
the increase in complexity is determined when a local complexity increases relative to a global complexity.

12. The non-transitory computer-readable medium of claim 10, wherein:
a sensitivity factor controls the transition from the first operating state to the second operating state.

13. The non-transitory computer-readable medium of claim 10, comprising further instructions that, when executed, cause the computer to:
Increase the first bit rate to the second bit rate in response to transitioning from the first operating state to the second operating state.

14. The non-transitory computer-readable medium of claim 10, comprising further instructions that, when executed, cause the computer to:
decrease the second bit rate to the first bit rate in the third operating state.

15. The non-transitory computer-readable medium of claim 10, comprising further instructions that, when executed, cause the computer to:
transition from the fourth operating state after excess bits consumed during the second operating state are compensated and a predetermined target bit rate is achieved over a predetermined duration of a video sequence.

16. The non-transitory computer-readable medium of claim 15, comprising further instructions that, when executed, cause the computer to:
transition from the fourth operating state to the first operating state in response to the excess bits consumed during the second operating state are compensated and the predetermined target bit rate is achieved over the predetermined duration of the video sequence.

17. The non-transitory computer-readable medium of claim 10, comprising further instructions that, when executed, cause the computer to:
transition from the first operating state to a fifth operating state in response to the complexity determination of the bit stream reduces below a third threshold.

18. The non-transitory computer-readable medium of claim 17, comprising further instructions that, when executed, cause the computer to:
transition from the first operating state to the fifth operating state by reducing a target bit rate below the first bit rate.

19. A method comprising:
determining an increase in complexity of a bit stream of a video sequence;
transitioning from a first operating state having a first bit rate to a second operating state having a second bit rate greater than the first bit rate in response to determining the increase in the complexity of the bit stream; and
in response to determining a decrease in the complexity of the bit stream while in the second operating state:
transitioning from the second operating state to the first operating state in response to an excess bit rate less than a threshold; and
in response to the excess bit rate above the threshold:
transitioning from the second operating state to a third operating state, the third operating state having the first bit rate; and
after operating in the third operating state for a predetermined number of pictures, transitioning to a fourth operating state, the fourth operating state having a third bit rate less than the second bit rate.

20. The method of claim 19, wherein determining the increase in complexity comprises determining that a local complexity increases relative to a global complexity.

* * * * *